United States Patent [19]
Kirby

[11] Patent Number: 5,950,947
[45] Date of Patent: Sep. 14, 1999

[54] LUBRICANT RETAINING DRAG FOR SPIN-CAST REELS

[76] Inventor: Thomas Glen Kirby, 304 W. Key West, Broken Arrow, Okla. 74011

[21] Appl. No.: 09/071,404

[22] Filed: May 1, 1998

Related U.S. Application Data

[63] Continuation-in-part of application No. 08/722,768, Sep. 27, 1996, abandoned.

[51] Int. Cl.[6] .................................................. A01K 89/02
[52] U.S. Cl. ......................... 242/244; 242/320; 188/290; 188/264 B
[58] Field of Search .................................... 242/244, 245, 242/290, 291, 320; 188/290, 264 B

[56] References Cited

U.S. PATENT DOCUMENTS

| | | | |
|---|---|---|---|
| 2,956,647 | 10/1960 | Bartholomaus | 188/290 X |
| 4,664,330 | 5/1987 | Darden | 242/244 |
| 4,674,698 | 6/1987 | Carpenter | 242/244 X |
| 4,756,487 | 7/1988 | Hayashi | 242/244 |
| 4,893,522 | 1/1990 | Arakawa | 188/290 X |
| 5,522,485 | 6/1996 | Takahashi et al. | 188/290 X |

*Primary Examiner*—Donald P. Walsh
*Assistant Examiner*—Emmanuel M. Marcelo

[57] ABSTRACT

A fishing reel of the spin-cast type, having a body with a fixed hub, a line carrying spool rotatably supported on the hub. The reel having rotatable and non-rotatable drag washers operating on the spool creating a drag assembly. For smooth drag action during heavy usage, a lubricant retaining cavity is positioned in the drag surface of a drag assembly member. The use of a lubricant retaining cavity being optional in one or all drag assembly members, that which provides the drag action desired. A lubricant retaining cavity positioned in the drag surface permits the cavity to be covered, and retains lubricant in the cavity when the drag surfaces are engaged. The spool rotates as line carried thereon is drawn therefrom, permitting lubricant to be wiped from the retaining cavity and about the engaging drag surfaces, thereby becoming a self lubricating drag assembly.

4 Claims, 4 Drawing Sheets

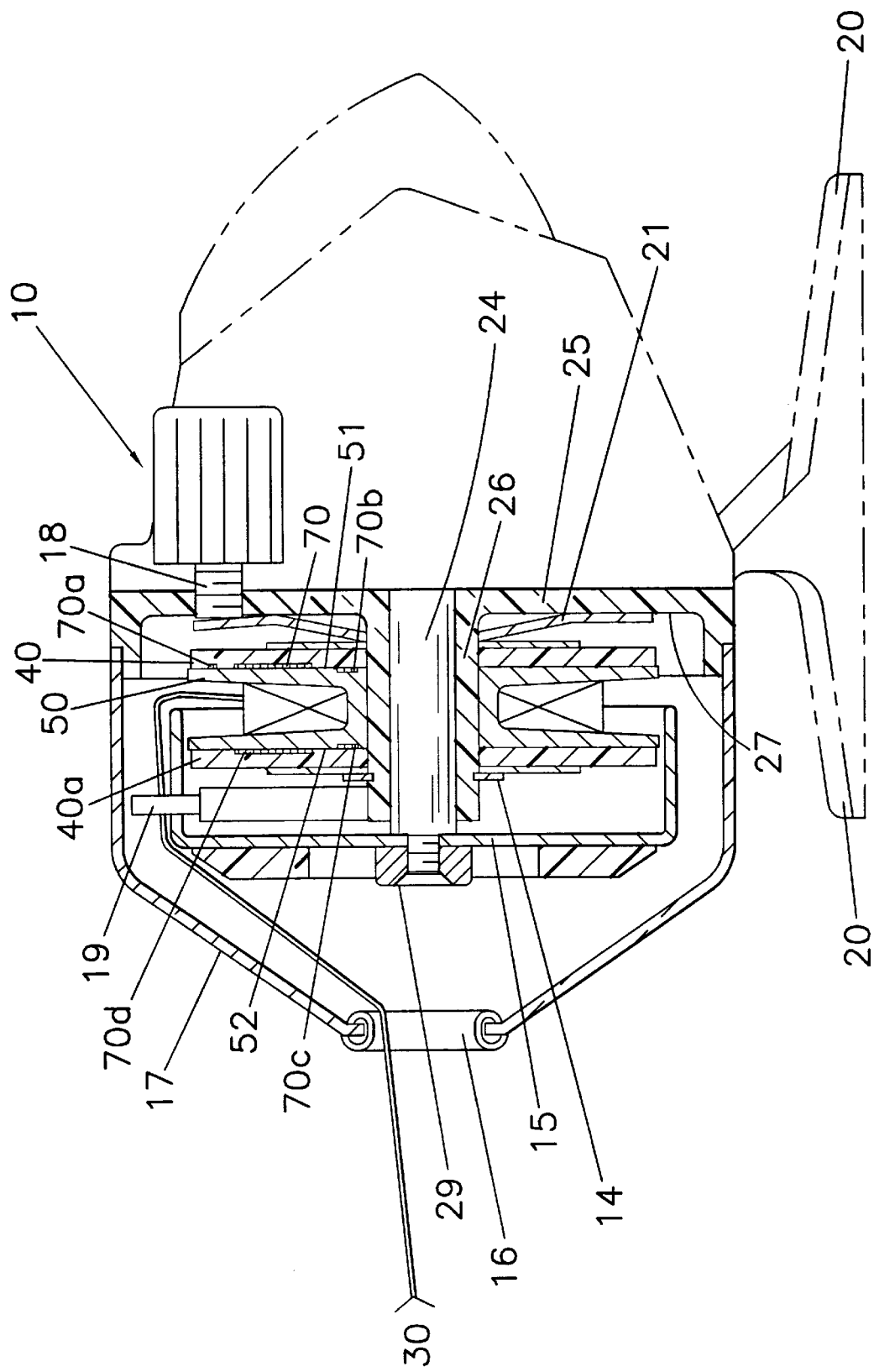

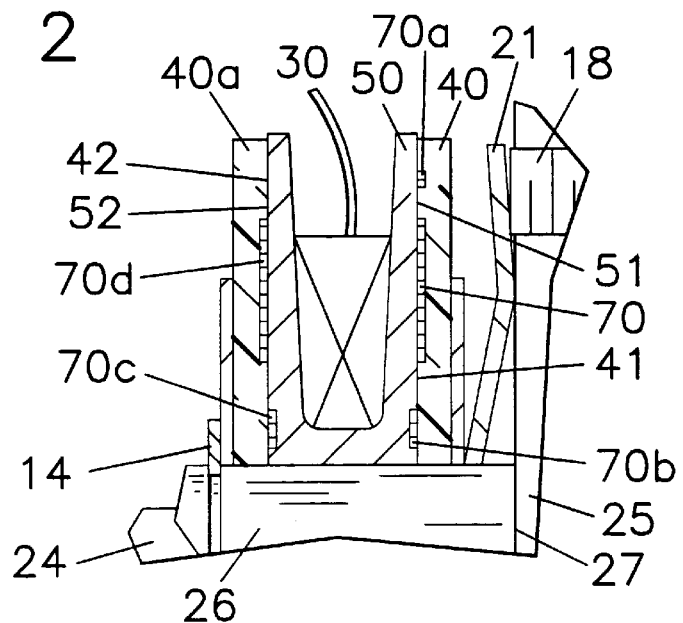
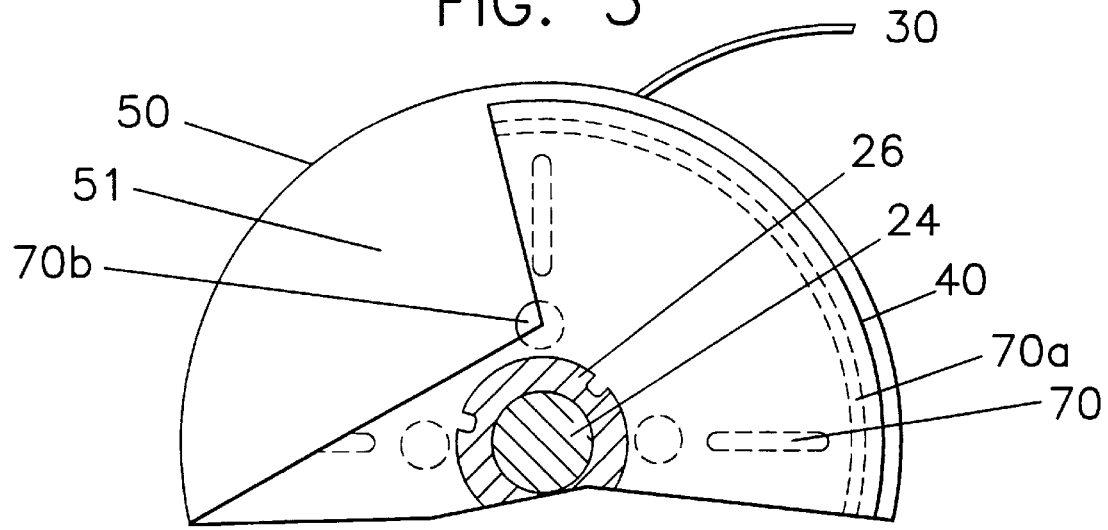

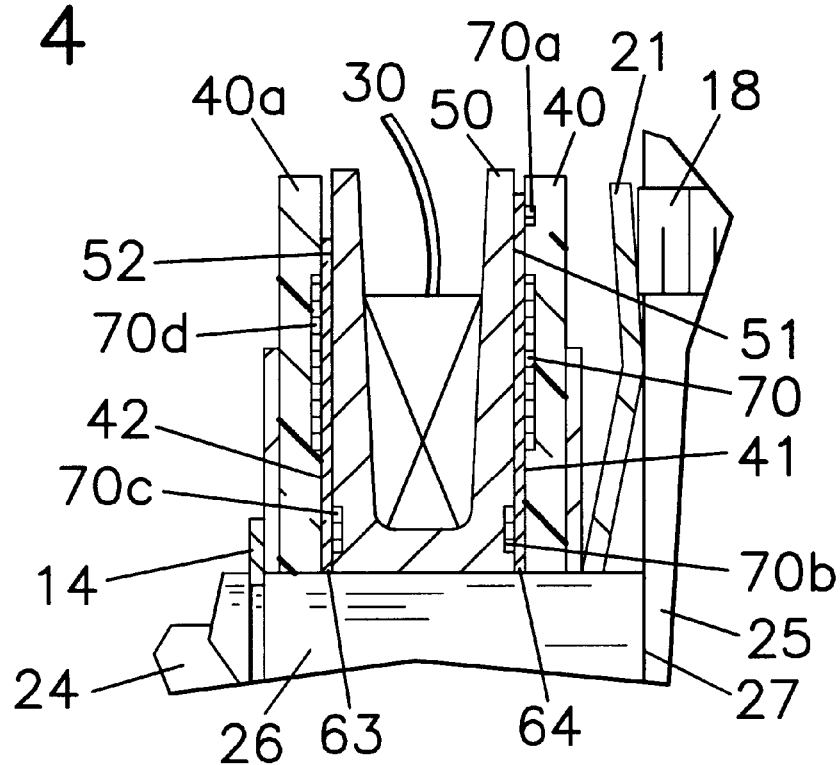
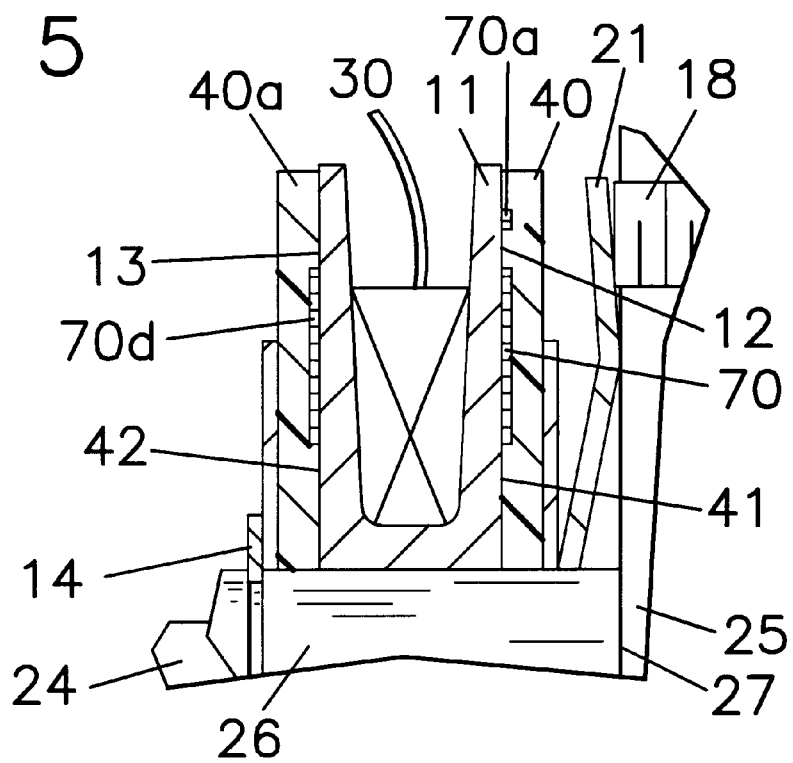

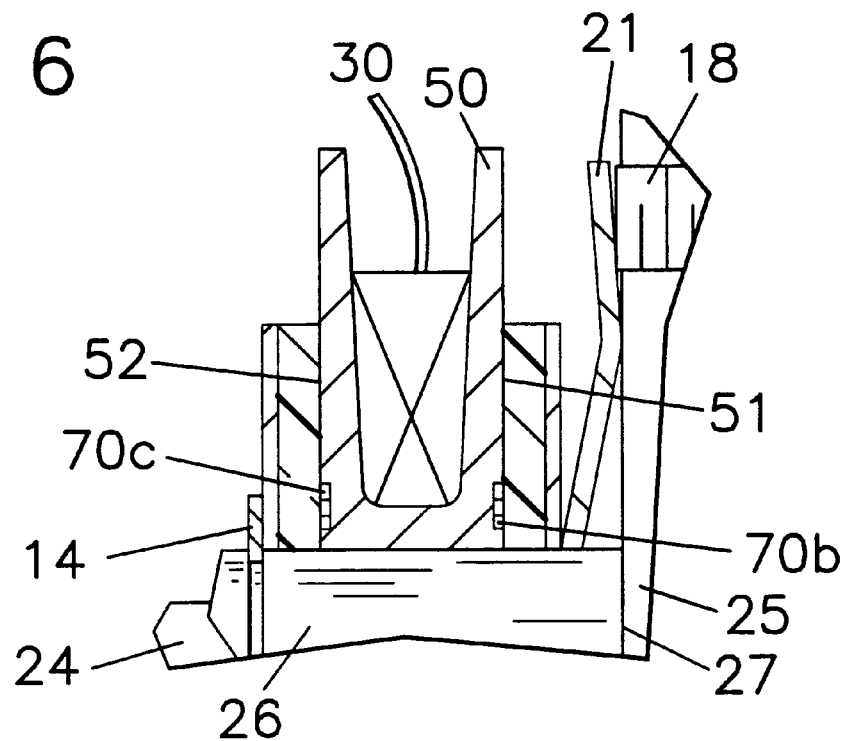
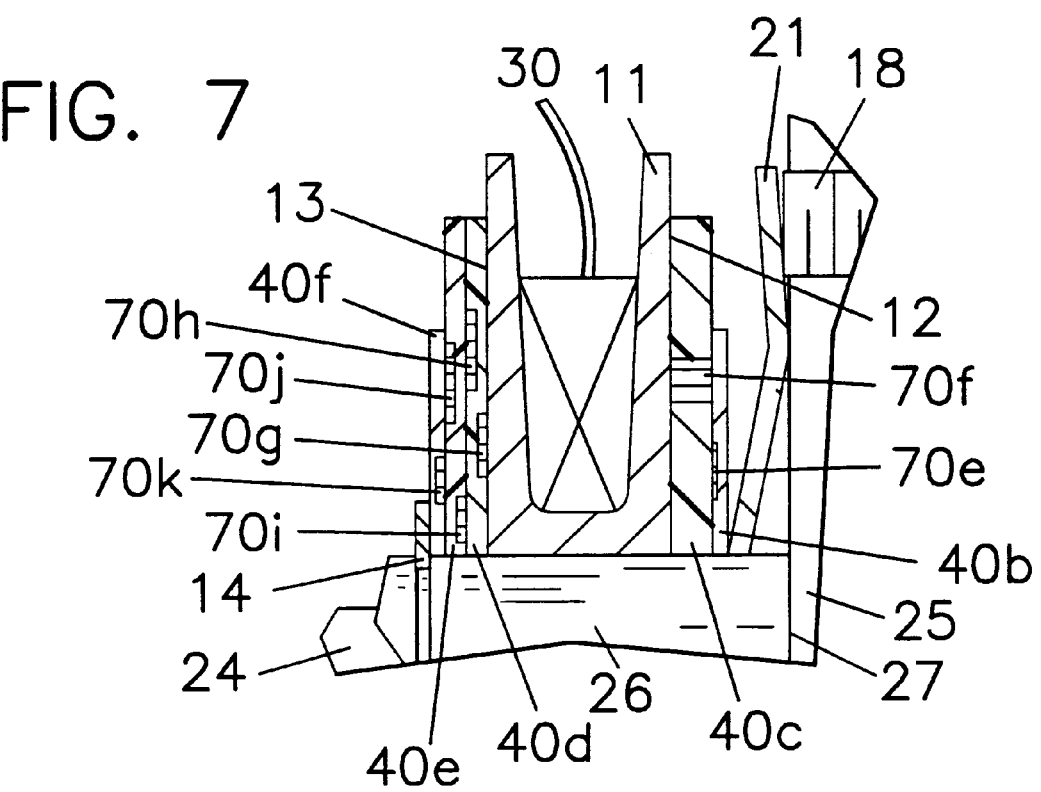

LUBRICANT RETAINING DRAG FOR SPIN-CAST REELS

RELATED APPLICATION

This application is a continuation-in-part, of application Ser. No. 08/722,768, filed Sep. 27, 1996, now abandoned.

BACKGROUND OF THE INVENTION

This invention relates to a new device for application to spin-cast fishing reels of current technology and future manufacture, and more particularly to a drag assembly adapted to provide means to alter or change drag assembly characteristics. The present invention is directed towards a lubricant retaining means in the drag surface of fishing reels of the spin-cast type having drag washers as part of the drag assembly operating on the spool. These reels normally have drag washers with grease applied to the surface during assembly, or impregnated as described in the Darden U.S. Pat. No. 4,664,330. A common complaint among fishermen is inconsistent drag performance as the spool rotates under heavy action against drag washers. While it is apparent that each of the examples of prior art possess merit, none have addressed the problem that the present invention is expressly intended to solve. A diligent search of the art has failed to reveal any examples of the technology herein disclosed.

SUMMARY OF THE INVENTION

The present invention relates to spin-cast fishing reels, having rotatable and non-rotatable washers with a spool interposed therebetween supported on a body hub, and drag surfaces of the washers operating on drag surfaces of the spool creating a drag assembly. For a smoother drag surface during heavy usage, a lubricant retaining cavity configured for storing the amount and lubricant desired, is positioned in the drag surface of selected members, that which provides the drag action desired. A cavity positioned in the drag surface is covered, and lubricant retained therein when the drag surfaces are engaged during assembly. The spool rotates as line carried thereon is drawn therefrom, and rotatable drag surfaces rotate against non-rotatable drag surfaces permitting lubricant stored therein to be wiped therefrom and about the engaging drag surfaces, becoming a self lubricating drag assembly. With the option of using lubricant retaining cavities in different drag members, permits the use of various lubricants in the same drag assembly, thereby adding performance to the drag assembly, an assembly that operates smoothly during heavy usage and varied weather conditions. Drag members being accessorial in nature and are applicable to reels of current and future manufacture, and may be used with my earlier U.S. Pat. No. 5,518,193. A conventional drag assembly member may be removed in the field and replaced by a member having lubricant retaining cavities therein in order that the advantages offered may be extended to the owners of all popular spin-cast reels.

BRIEF DESCRIPTION OF THE DRAWINGS

FIG. 1 is a fragmented vertical section through a spin-cast style fishing reel incorporating the invention; and FIG. 2 is a fragmented section, on an enlarged scale, of that portion of the reel incorporating the preferred embodiment of the lubricant retaining system.

FIG. 3 is a back view partially broken away incorporating the preferred embodiment of the invention.

FIG. 4 is a cross-sectional view of a first alternate embodiment of the invention.

FIG. 5 is a cross-sectional view of a second alternate embodiment of the invention.

FIG. 6 is a cross-sectional view of another design which may be employed in the reel of FIG. 1.

FIG. 7 is a cross-sectional view of still another design which may be employed in the reel of FIG. 1.

PREFERRED EMBODIMENTS OF THE INVENTION

Referring to the drawing figures in greater detail, there is shown in FIG. 1, a spin-cast style fishing reel, generally designated 10, a reel embodying the principles of this invention. The reel includes a front shield 17, a line guide 16, and is mounted detachably on the outer periphery of the body 25, a mounting foot 20 for attachment of the reel to a fishing rod. The body 25 having a deck plate 27, attached to or formed as part of the deck plate 27 is a fixed hub 26, having a keyway, spline or the like (not shown) . A line carrying spool 50 is supported on the hub 26 for maintaining a supply of fishing line 30. The spool 50 having a rearward drag surface 51 and a forward drag surface 52. A removable retainer 14 on the hub 26, axially positions the spool 50 between drag washers adjacent the deck plate 27, having a drag adjusting plate 21 between the drag washer and deck plate 27. A drag adjusting mechanism 18 increases and decreases pressure on the drag adjusting plate 21, permitting the drag washers to act against the spool 50 as adjusted by the drag adjusting mechanism 18. A rotatable center shaft 24 extends axially through the hub 26. A rotor 15 is secured by a nut 29 to the forward end of the center shaft 24 and at least partially longitudinally overlaps the forward drag surface 52 of the spool 50 best seen in FIG. 1. The center shaft 24 is attached at the rear to a gearing mechanism (not shown) which is in turn attached to a hand crank (not shown). The hand crank through the gearing mechanism, may be rotated to turn the rotor 15, this action causes a line engaging means 19 to extend outward for winding line 30 onto the spool 50. Line 30 withdrawn causes an anti-reverse mechanism (not shown) to engage, preventing the rotor 15 from reversing directions; this action causes line 30 to be drawn over the rotor 15 whereby the normally non-rotatable spool 50 rotates against adjustable drag pressure applied to its rearward drag surface 51 and forward drag surface 52 by combined drag washers to prevent line 30 breakage. All elements described to this point in this detailed description; that is, elements 10–30, are typical of commercially available spin-cast fishing reels. In the first instance, it should be recognized that the present invention is an improved drag assembly having a spool, and or a drag washer having lubricant retaining means formed therein for spin-cast reels which is accessorial in nature and is applicable and adjunctive to such reels of the past, current and future production of a wide number of manufacturers. It should be further recognized that the invention may be employed singularly or in combination, in conjunction with a wide variety of spin-cast reels to effect marked changes in the drag assembly characteristics of said reels. Present technology in typical spin-cast fishing reels; lubricant is applied normally to the surfaces of a drag washer or lifetime impregnation of the washer. With impregnated drag washers the user is left without the option of changing lubricant when desired, and applied grease to conventional drag washers is normally lacking when the drag surfaces experience excessive heating during heavy usage. Referring to the drawing figures, it will be readily seen that the present invention offers a simple solution to the aforementioned problems through the provision of at least one lubricant retaining cavity 70 configured for the amount and lubricant desired, and positioned in the drag surface of a drag washer 40 and, or a spool 50. The drag washer 40 and or spool 50 may be formed of different materials, including plastic, metal, or a combination thereof, a material which is compatible with the drag action desired.

Illustrated in FIGS. 1, 2, and 3 and preferred arrangement, is accomplished by the line 30 carrying spool 50 rotatably supported on the hub 26. The spool 50 having at least one lubricant retaining cavity 70b configured for storing lubricant therein, and lubricant retaining cavity 70b is positioned in the rearward drag surface 51 of the spool 50, and the spool 50 having at least one lubricant retaining cavity 70c positioned in the forward drag surface 52. A non-rotatable washer 40 having at least one lubricant retaining cavity 70 configured for storing lubricant therein, and said lubricant retaining cavity 70, along with lubricant retaining cavity 70a is positioned in the drag surface 41 of said washer 40, and washer 40 is supported on the hub 26 wherein the drag surface 41 engages the rearward drag surface 51 of the spool 50. A second non-rotatable washer 40a having at least one lubricant retaining cavity 70d configured for storing lubricant therein, and said lubricant retaining cavity 70d is positioned in the drag surface 42 of said second washer 40a. A removable retainer 14 on the hub 26 axially positions the second washer 40a on the hub 26 with its drag surface 42 engaging the forward drag surface 52 of the spool 50. Combined first mentioned washer 40 and said second washer 40a to act against the spool 50 as adjusted by the drag adjusting mechanism 18. Lubricant retaining cavities 70, 70a and 70b are covered by engaging drag surfaces 41 and 51, and lubricant retaining cavities 70d and 70c are covered by engaging drag surfaces 42 and 52. And lubricant retaining cavities 70, 70a and 70b retain lubricant therein by engaging drag surfaces 41 and 51, and lubricant retaining cavities 70d and 70c retain lubricant therein by engaging drag surfaces 42 and 52. The spool 50 rotates as line 30 carried thereon is drawn therefrom, and rotatable drag surfaces 51 and 52 on the spool rotate against non-rotatable drag surfaces 41 and 42 on non-rotatable washers 40 and 40a. This action permits lubricant stored in the lubricant retaining cavities 70, 70a, 70b, 70c, and 70d to be wiped therefrom, and wiped about drag surfaces 41, 51, 42 and 52.

FIG. 3 shows a back view partially broken away to expose at least one lubricant retaining cavity 70b positioned in the drag surface 51 of the spool 50, and the location of at least one lubricant retaining cavity 70, and at least one lubricant retaining cavity 70a positioned in the drag surface of washer 40.

FIG. 4 shows an alternate embodiment of the spool 50, non-rotatable washer 40 and second non-rotatable washer 40a mounted in the same way as in FIG. 2 but provides for at least one rotatable engaging washer 64 and at least one rotatable engaging washer 63 for a different drag characteristic.

FIG. 5 shows an alternate embodiment of the invention. Non-rotatable washer 40 engaging the rearward drag surface 12 of a conventional spool 11. A removable retainer 14 on the hub 26 axially positions a second non-rotatable washer 40a with its drag surface 42 engaging the forward drag surface 13 of the spool 11.

As illustrated in FIG. 6, the spool 50 is supported on the hub 26, between conventional drag means positioned axially against the deck plate 27 by a removable retainer 14, having a drag adjusting plate 21 between the deck plate 27 and conventional drag means.

FIG. 7 illustrates yet another embodiment of the invention, non-rotatable washer 40b having at least one lubricant retaining cavity 70e positioned therein, and said washer 40b engaging the rearward drag surface 12 of the spool 11, having rotatable washer 40c interposed therebetween; and washer 40c having at least one lubricant retaining cavity 70f therein. Non-rotatable washer 40f having at least one lubricant retaining cavity 70k therein. A removable retainer 14 on the hub 26 axially positions washer 40f adjacent the forward drag surface 13 of the spool 11, having rotatable washer 40e and rotatable washer 40d interposed therebetween. Washer 40d having lubricant retaining cavities 70g and 70h positioned therein, and washer 40e having lubricant retaining cavities 70i and 70k positioned therein.

Thus, the drag assemblies described herein provide a unique arrangement which enables the designer to select an assembly, that provides the type of drag action desired. The rotatable washers, spools and non-rotatable washers being adaptable to and interchangeable with all of the drag assemblies shown in the drawing figures, whereby reels of current and future manufacture enables the user of the reel having a variety of options, to select that which provides the type of drag action desired.

While there has hereinabove been disclosed, described and depicted the currently preferred embodiment of the present invention, it should be understood that such was done for purposes of explanation and elucidation only and that certain changes, modifications, additions, deletions and improvements may be made thereto, within the scope of the claims hereinunder appended.

What I claim is:

1. In a spin-cast fishing reel comprising:
   a line carrying spool rotatably supported on a body hub, said spool having a rearward drag surface and a forward drag surface, rotatable and non-rotatable washers, said washers having a drag surface, and said washers supported on said hub having said spool interposed therebetween, creating a drag assembly, the improved drag assembly comprising:
   at least one lubricant retaining cavity configured for storing lubricant therein, and wherein
   said lubricant retaining cavity is positioned within at least one drag surface of said drag assembly.

2. A spin-cast reel as described in claim 1, wherein said lubricant retaining cavity is covered by engaging said drag surfaces.

3. A spin-cast reel as described in claim 1, wherein said lubricant retaining cavity retains lubricant therein by engaging said drag surfaces.

4. A spin-cast real as described in claim 1, wherein
   said spool rotates as line carried thereon is drawn therefrom, and wherein
   rotatable drag surfaces rotate against non-rotatable drag surfaces, and
   said lubricant retaining cavity permits lubricant stored therein to be wiped therefrom, and wherein said lubricant is wiped about said drag surfaces.

* * * * *